(12) United States Patent
Lee et al.

(10) Patent No.: US 9,796,285 B2
(45) Date of Patent: Oct. 24, 2017

(54) ON-BOARD CHARGER FOR ECO-FRIENDLY VEHICLE

(71) Applicant: Hyundai Motor Company, Seoul (KR)

(72) Inventors: Jaewon Lee, Gyeonggi-do (KR);
Sanghoon Kwak, Gyeonggi-do (KR);
Jeehye Jeong, Gyeonggi-do (KR);
Junghwan Na, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 337 days.

(21) Appl. No.: 14/504,761

(22) Filed: Oct. 2, 2014

(65) Prior Publication Data

US 2015/0115873 A1    Apr. 30, 2015

(30) Foreign Application Priority Data

Oct. 25, 2013    (KR) ................. 10-2013-0127624

(51) Int. Cl.
| | | |
|---|---|---|
| *H02J 7/00* | (2006.01) | |
| *H02J 7/04* | (2006.01) | |
| *B60L 11/18* | (2006.01) | |
| *H01M 10/44* | (2006.01) | |

(52) U.S. Cl.
CPC ....... *B60L 11/1838* (2013.01); *B60L 11/1816* (2013.01); *B60L 11/1818* (2013.01); *B60L 11/1803* (2013.01); *B60L 11/1825* (2013.01); *H01M 10/44* (2013.01); *H01M 2220/20* (2013.01); *H02J 7/007* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01)

(58) Field of Classification Search
USPC .................. 320/109, 108, 107, 104, 134; 180/65.275, 65.29
See application file for complete search history.

(56) References Cited

U.S. PATENT DOCUMENTS

| | | | |
|---|---|---|---|
| 8,749,198 B2 | 6/2014 | Klesyk | |
| 2011/0207358 A1* | 8/2011 | Ichikawa | B60L 11/123 439/345 |
| 2011/0216451 A1* | 9/2011 | Haines | B60L 3/0069 361/42 |
| 2012/0098490 A1* | 4/2012 | Masuda | B60L 3/0069 320/109 |
| 2013/0099740 A1* | 4/2013 | Takashima | B60L 11/1816 320/109 |

(Continued)

FOREIGN PATENT DOCUMENTS

| | | |
|---|---|---|
| JP | 2001-128383 A | 5/2001 |
| JP | 2009171733 A | 7/2009 |

(Continued)

*Primary Examiner* — Alexis Pacheco
(74) *Attorney, Agent, or Firm* — Mintz Levin Cohn Ferris Glovsky and Popeo, P.C.; Peter F. Corless

(57) ABSTRACT

An on-board charger for an eco-friendly vehicle includes a timer-type control pilot (CP) detection circuit, which is connected to electric vehicle supply equipment (EVSE) using a connector, that: i) detects a CP signal transmitted from the EVSE as an input signal via the connector, ii) outputs the CP signal as a direct current (DC) signal recognized as DC, and iii) allows an on-board charger (OBC) control circuit to control a charge to be maintained in a turned-on state by the DC signal.

4 Claims, 5 Drawing Sheets

(56) References Cited

U.S. PATENT DOCUMENTS

| | | | |
|---|---|---|---|
| 2013/0162208 A1* | 6/2013 | Ohnuki | B60L 11/1803 320/109 |
| 2013/0335024 A1* | 12/2013 | Akai | H01M 10/44 320/109 |
| 2015/0299985 A1* | 10/2015 | Takehara | B60K 1/00 701/22 |

FOREIGN PATENT DOCUMENTS

| | | |
|---|---|---|
| JP | 2010-081661 A | 4/2010 |
| JP | 2011024317 A | 2/2011 |
| JP | 2011205840 A | 10/2011 |
| JP | 2013-048523 A | 3/2013 |
| KR | 10-2010-0092062 | 8/2010 |

* cited by examiner

ON-BOARD CHARGER FOR ECO-FRIENDLY VEHICLE

CROSS-REFERENCE TO RELATED APPLICATIONS

This application claims priority to Korean Patent Application No. 10-2013-0127624, filed on Oct. 25, 2013, which is incorporated herein by reference in its entirety.

BACKGROUND

Technical Field

Exemplary embodiments of the present disclosure relate to an eco-friendly vehicle, and, particularly, to an on-board charger for an eco-friendly vehicle, which uses a detection circuit having high reliability of control pilot (CP) signals transmitted from electric vehicle supply equipment to the on-board charger, so as to be capable of achieving an improvement in performance and reductions in cost and size of the charger.

Description of Related Art

In general, an electric vehicle (EV) or a plug-in hybrid electric vehicle (PHEV) are considered eco-friendly vehicles and equipped with a charger power system for charging of traction batteries. Such a charger power system is connected to electric vehicle supply equipment (hereinafter, referred to as "EVSE"), and the EVSE is classified into a quick charger and a slow charging stand. The quick charger is configured in a manner to use direct current (DC) power and rapidly charge batteries by controlling a battery management system (hereinafter, referred to as "BMS"), whereas the slow charging stand is configured in a manner to use AC power and slowly charge batteries by control of the BMS and an on-board charger (hereinafter, referred to as "OBC").

Typically, when batteries are charged under control of the OBC in a state in which the vehicle ignition is turned off, a connector of the EVSE is connected to a control circuit so that the control circuit is turned on. Meanwhile, the control circuit should be maintained in a turned-on state while the charge is performed. However, due to the J1772 standard, which is a charging standard, it is impossible to directly turn on the control circuit using provided signals. For this reason, control pilot (hereinafter, referred to as "CP") signals transmitted from the EVSE to the charger are used to directly turn on the control circuit. However, since the CP signals are pulse-width modulation (PWM) signals, there is a limit to maintain a turned-on state directly using the signals.

For this reason, controlling the control circuit so it is turned on during charging of batteries uses a method (e.g., "first method") of enabling signals by separately providing an always-operating CP detection circuit besides the control circuit, or a method (e.g., "second method") of processing CP signals after an auxiliary power unit is turned on through initial input of the CP signals so as to continuously generate enable signals. However, the first method to control the control circuit so it is turned on during charging of batteries may be adversely affected by dark current. In addition, the second method is limited to uniformly generate output signals due to various conditions of the CP signals changed according to an input voltage range of 6 to 12V and a duty ratio of 5 to 95%. To this end, a smoothing circuit and/or amplifier circuit may be used, but problems arise in that a driving time of the circuit is limited, and the circuit has a likelihood of unstably operating.

SUMMARY

Embodiments of the present disclosure are directed to an on-board charger for an eco-friendly vehicle, which uses a timer circuit as a detection circuit for converting CP signals transmitted from EVSE to an OBC into DC signals recognized as DC and for outputting the DC signals, that enhances operation reliability by removing the likelihood of abnormal operation due to unknown voltage, as well as realization of rapid response speed and stable operability, by continuously maintaining output of the DC signals so long as the CP signals are transmitted to the OBC. The disclosed embodiments are capable of achieving an improvement in performance and reductions in cost and size of the OBC.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with embodiments of the present disclosure, an on-board charger for an eco-friendly vehicle includes a CP detection circuit, which is connected to EVSE using a connector, that: i) detects a CP signal transmitted from the EVSE as an input signal via the connector, ii) outputs the CP signal as a DC signal recognized as DC, and iii) allows an OBC control circuit to control a charge to be maintained in a turned-on state by the DC signal.

The CP detection circuit may be a timer-type CP detection circuit, and the timer-type CP detection circuit may have an output duration set to be longer than a period of the CP signal.

The CP detection circuit may be a comparator-type CP detection circuit, and the comparator-type CP detection circuit may be configured by a 2ch open drain (collector) type comparator.

The CP detection circuit may be an integrated circuit (IC) timer-type CP detection circuit, and the IC timer-type CP detection circuit may be configured by a timer IC which is a missing pulse detector of a 555 timer circuit.

The timer-type CP detection circuit, the comparator-type CP detection circuit, or the IC timer-type CP detection circuit may be supplied with power from an auxiliary power unit, the DC signal may be transmitted to a main power unit via an on/off logic supplied with power from the auxiliary power unit, and the OBC control circuit may be turned on by the main power unit.

DESCRIPTION OF SPECIFIC EMBODIMENTS

Figure 1:
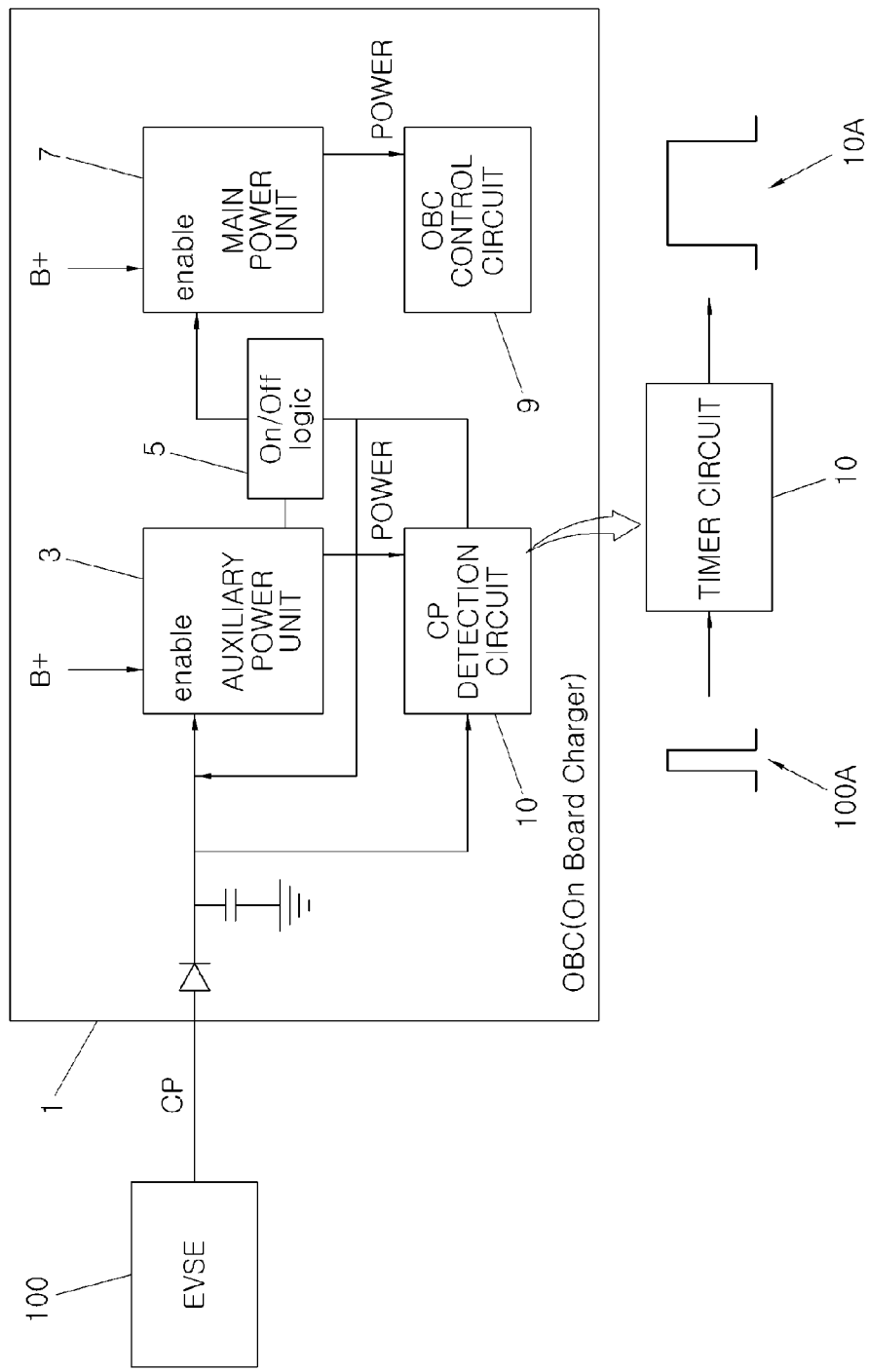
FIG. 1 is a diagram illustrating a configuration of an on-board charger for an eco-friendly vehicle including a timer type detection circuit according to embodiments of the present disclosure.

Exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

FIG. 1 is a diagram illustrating a configuration of an on-board charger for an eco-friendly vehicle including a timer-type detection circuit according to embodiments of the present disclosure.

As shown in the drawing, an OBC (on-board charger) 1 includes a timer-type CP (Control Pilot) detection circuit 10 which detects CP signals transmitted from EVSE (Electric Vehicle Supply Equipment) 100 and converts the detected CP signals into signals recognized as DC to output the DC signals. The timer-type CP detection circuit 10 is operated such that when a CP signal 100A is input as a PWM signal, the signal is input and then maintained in a high state for a certain time to be output as a DC signal 10A.

In addition, the OBC 1 includes an auxiliary power unit 3 for supplying power to the timer-type CP detection circuit 10 and a main power unit 7 for supplying power to an OBC control circuit 9. Furthermore, the OBC 1 further includes an on/off logic 5 supplied with power from the auxiliary power unit 3. The on/off logic 5 transmits the signal output from the timer-type CP detection circuit 10 to the main power unit 7 so that the CP signal is maintained in an enabled state during charging of batteries.

Figure 2A:
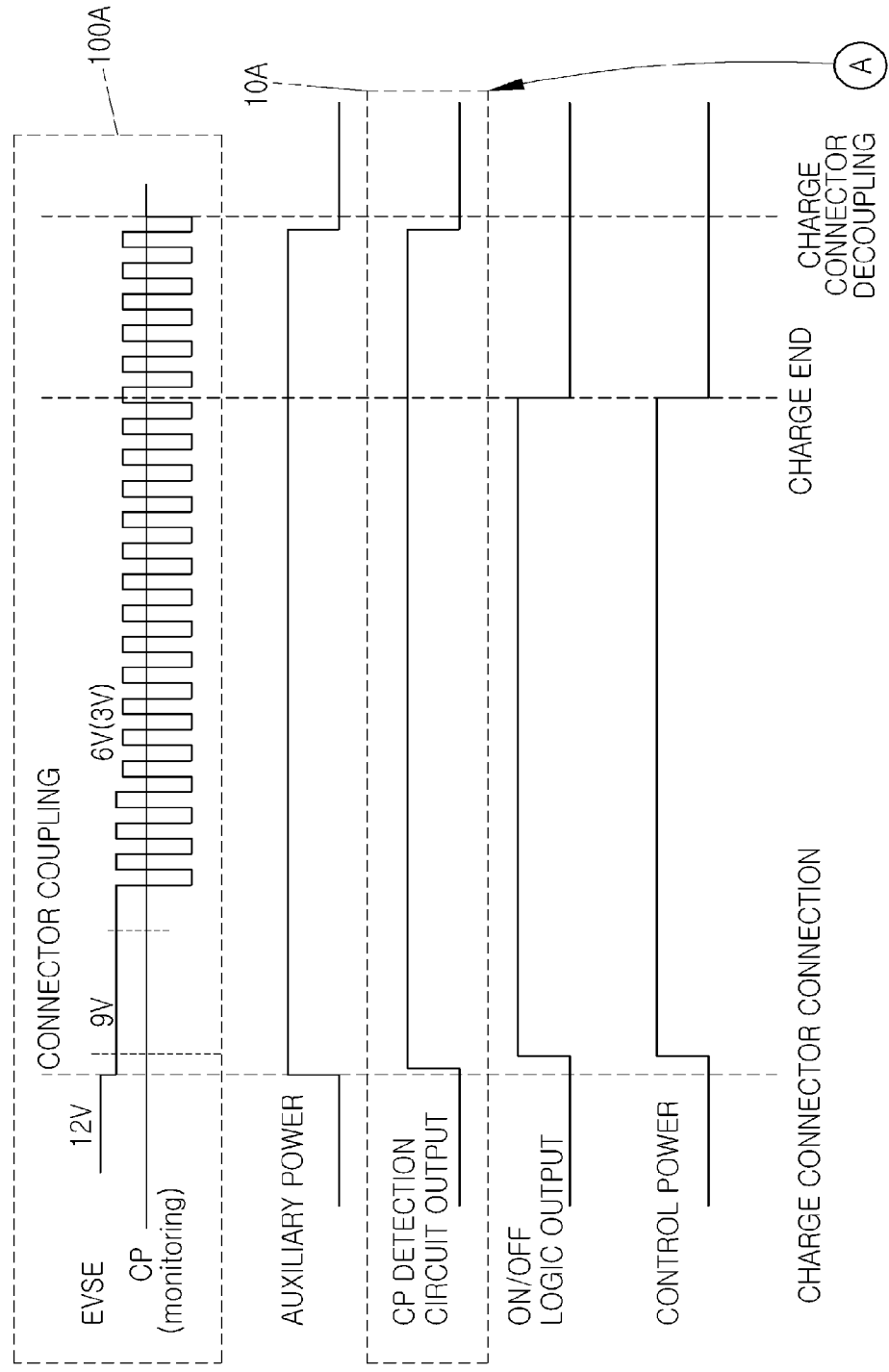
FIGS. 2A and 2B are charts illustrating output of a DC signal converted from a CP signal by the timer type detection circuit according to embodiments of the present disclosure.
Figure 2B:
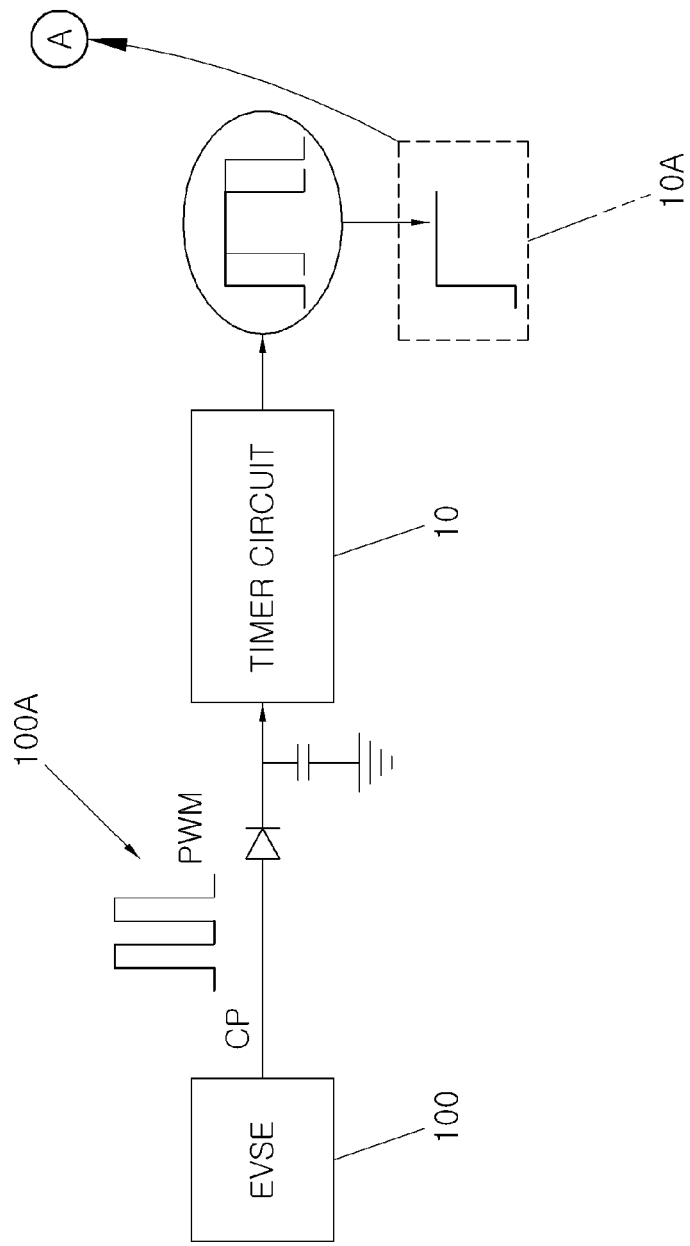

Meanwhile, FIGS. 2A and 2B illustrate an operation state of the OBC 1 including the timer-type CP detection circuit 10 according to embodiments of the present disclosure. As shown in the drawing, when the EVSE 100 is connected to the OBC 1 using a connector, the EVSE 100 transmits the CP signal 100A as a PWM signal to the OBC 1 and the timer-type CP detection circuit 10 detects the CP signal 100A input to the OBC 1.

Here, the timer-type CP detection circuit 10 allows the signal to be input and then maintained in a high state for a certain time. Particularly, the timer-type CP detection circuit 10 has an output duration set to be longer than an input signal period. Therefore, in the timer-type CP detection circuit 10, continuous high output is generated with respect to the CP signal 100A which is continuously input, and eventually the DC signal 10A recognized as DC is formed and output by the output duration longer than the input signal period. The DC signal 10A is transmitted via the on/off logic 5 to the main power unit 7 so that the control circuit is maintained in a turned-on state while the charge is performed.

In particular, since the DC signal 10A output from the timer-type CP detection circuit 10 is continuously maintained so long as the CP signal 100A is input to the timer-type CP detection circuit 10, stable operability is realized together with rapid response speed and operation reliability is enhanced by removal of the likelihood of abnormal operation due to unknown voltage. In addition, when the same function is realized, it may be possible to reduce the size of the timer-type CP detection circuit 10 compared to a smoothing circuit and/or amplifier circuit. Above all, it may be possible to achieve an improvement in performance and a reduction in costs of the OBC 1 through high reliability.

Figure 3:
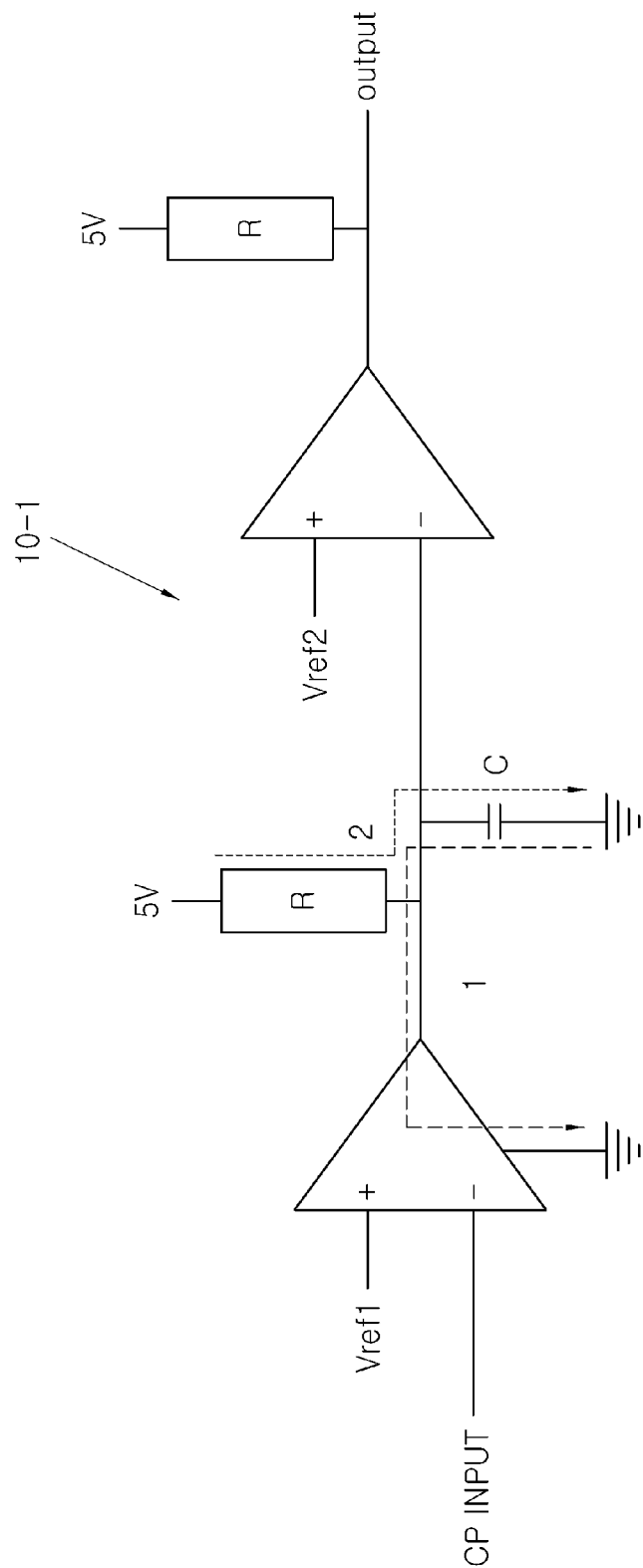
FIG. 3 is a diagram illustrating a first modified example of the detection circuit according to embodiments of the present disclosure configured by a 2ch open drain (collector) type comparator.

Meanwhile, FIG. 3 is a diagram illustrating a first modified example of the detection circuit according to embodiments of the present disclosure configured by a 2ch open drain-(collector) type comparator. As shown in the drawing, a comparator-type CP detection circuit 10-1 is configured by a 2ch open drain-(collector) type comparator. Accordingly, the comparator-type CP detection circuit 10-1 has a different configuration from the timer-type CP detection circuit 10 of FIG. 1.

In addition, the comparator-type CP detection circuit 10-1 is operated such that a CP input signal (e.g., CP signal 100A of FIG. 1) is input in a state of having a voltage higher than a first reference voltage Vref1 when input in a high state and thus a voltage charged to a capacitor C by one pass is discharged. Therefore, an output signal (e.g., DC signal 10A of FIG. 1) is output in a high state.

Since the CP input signal (e.g., CP signal 100A of FIG. 1) enters an open drain state in a low state, the capacitor C is charged by two passes. Therefore, when a value of a voltage charged due to the delay by the resistor R and capacitor C is set to be less than a second reference voltage Vref2, the output signal (e.g., DC signal 10A of FIG. 1) is output from the circuit in a high state for a designated time.

Next, when a next CP input signal (e.g., CP signal 100A of FIG. 1) is input to the circuit, the circuit discharges the voltage by one pass again so that the output signal (e.g., DC signal 10A of FIG. 1) is output in a high state. In particular, since duty is changed and frequency is uniform in the CP input signal (e.g., CP signal 100A of FIG. 1), the input signal may be continuously input in a high state at regular time intervals, and the output signal may be continuously output in a high state. Therefore, similarly to the timer-type detection circuit 10 of FIG. 1, the control circuit is stably and continuously maintained in the turned-on state so long as the CP signal is input to the comparator-type CP detection circuit 10-1.

Figure 4:
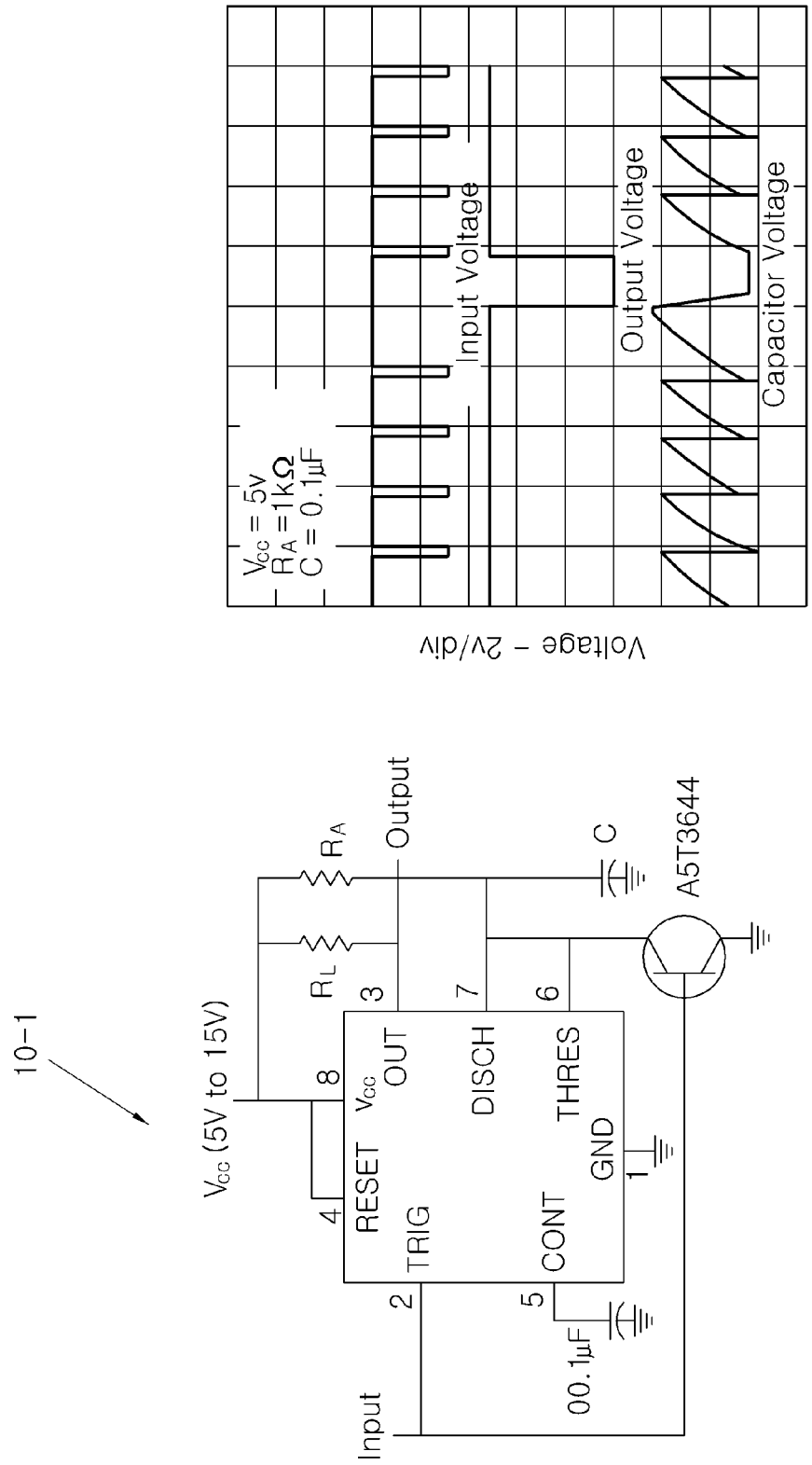
FIG. 4 is a diagram illustrating a second modified example of the detection circuit according to embodiments of the present disclosure configured by a missing pulse detector of a 555 timer circuit which is a general-purpose timer IC.

Meanwhile, FIG. 4 is a diagram illustrating a second modified example of the detection circuit according to embodiments of the present disclosure configured by a missing pulse detector of a 555 timer circuit which is a general-purpose timer IC.

As shown in the drawing, an IC timer-type CP detection circuit 10-2 is configured by a general-purpose timer IC using a missing pulse detector of a 555 timer circuit. Accordingly, the IC timer-type CP detection circuit 10-2 has a different configuration from the timer-type CP detection circuit 10 of FIG. 1 or the comparator-type CP detection circuit 10-1 of FIG. 3.

In addition, the IC timer-type CP detection circuit 10-2 has the same operation principle as the timer-type CP detection circuit 10 of FIG. 1 or the comparator-type CP detection circuit 10-1 of FIG. 3, except that the IC timer-type CP detection circuit 10-2 responds to a negative edge unlike the timer-type CP detection circuit 10 of FIG. 1 or the comparator-type CP detection circuit 10-1 of FIG. 3. For example, when a CP input signal (e.g., CP signal 100A of FIG. 1) is input to the IC timer-type CP detection circuit 10-2, an output signal is output in a low state when the input signal is input in a longer state compared to a designated timing interval. Therefore, similarly to the timer-type detection circuit 10 of FIG. 1, the control circuit is stably and continuously maintained in the turned-on state so long as the CP signal is input to the IC timer-type CP detection circuit 10-2.

As described above, the on-board charger for an eco-friendly vehicle according to the embodiments disclosed herein includes the timer-type CP detection circuit 10, which is connected to EVSE 100 using a connector, that: i) detects a CP signal 100A transmitted from the EVSE as an input signal through connection of the connector, ii) outputs the CP signal 100A as a DC signal 10A recognized as DC, and iii) allows the OBC control circuit 9 to be maintained in the turned-on state by the DC signal 10A. Consequently, the turned-on state of the OBC control circuit 9 required during charging of batteries may be continuously maintained by rapid response speed and stable operability. In particular, operation reliability of the timer-type CP detection circuit 10 may be significantly increased by removing the likelihood of abnormal operation due to unknown voltage. Thus, it may be possible to achieve an improvement in performance and reductions in cost and size of the OBC through high reliability.

As is apparent from the above description, since the present disclosure uses a timer circuit as a detection circuit for converting CP signals transmitted from EVSE to an OBC into DC signals recognized as DC so as to output the DC signals, it may be possible to remove the likelihood of abnormal operation due to unknown voltage as well as realization of stable operability based on continuous output of the DC signals and rapid response speed. In addition, the present disclosure may enhance performance of the OBC by high operation reliability of the timer circuit capable of realizing stable operability and removing the likelihood of abnormal operation due to unknown voltage. Particularly, it may be possible to significantly improve malfunction which is frequently generated in the field during charging of batteries by largely reducing the likelihood of malfunction. Consequently, customer satisfaction may be significantly increased. In addition, the present disclosure may reduce the size of a printed circuit board (PCB) by simplifying a structure of a CP input driving circuit using the timer circuit, reduce part costs due to the size reduction, and reduce development costs according to an improvement in performance of electromagnetic waves by increasing a mounting area within the PCB.

While the present disclosure has been described with respect to the specific embodiments, it will be apparent to those skilled in the art that various changes and modifications may be made without departing from the spirit and scope of the disclosure as defined in the following claims.

What is claimed is:

1. An on-board charger for an eco-friendly vehicle, comprising:
a control pilot (CP) detection circuit, which is connected to electric vehicle supply equipment (EVSE) using a connector, that: i) detects a CP signal transmitted from the EVSE as an input signal via the connector, ii) outputs the CP signal as a direct current (DC) signal recognized as DC, and iii) allows an on-board charger (OBC) control circuit to control a charge to be maintained in a turned-on state by the DC signal,
wherein the CP detection circuit is a timer-type CP detection circuit, and the timer-type CP detection circuit has an output duration set to be longer than a period of the CP signal, and
wherein the DC signal output from the timer-type CP detection circuit is continuously maintained so long as the CP signal is input to the timer-type CP detection circuit.

2. The on-board charger of claim 1, wherein the CP detection circuit is a comparator-type CP detection circuit, and the comparator-type CP detection circuit is configured by a 2ch open drain-type comparator.

3. The on-board charger of claim 1, wherein the CP detection circuit is an integrated circuit (IC) timer-type CP detection circuit, and the IC timer-type CP detection circuit is configured by a timer IC which is a missing pulse detector of a 555 timer circuit.

4. The on-board charger of claim 1, wherein a timer-type CP detection circuit, a comparator-type CP detection circuit, or an IC timer-type CP detection circuit is supplied with power from an auxiliary power unit, the DC signal is transmitted to a main power unit via an on/off logic supplied with power from the auxiliary power unit, and the OBC control circuit is turned on by the main power unit.

* * * * *